United States Patent [19]
Ort

[11] 3,780,471
[45] Dec. 25, 1973

[54] WATER RECLAMATION-ALGAE PRODUCTION

[75] Inventor: Jay E. Ort, Lubbock, Tex.

[73] Assignee: Era Incorporated, Clovis, N. Mex.

[22] Filed: Feb. 28, 1972

[21] Appl. No.: 229,742

Related U.S. Application Data

[63] Continuation-in-part of Ser. No. 55,570, July 16, 1970, Pat. No. 3,645,040.

[52] U.S. Cl............................ 47/1.4, 47/58, 210/170
[51] Int. Cl............................................. A01g 7/00
[58] Field of Search .................. 47/1.4, 58; 210/170

[56] References Cited
UNITED STATES PATENTS

| | | | |
|---|---|---|---|
| 3,444,647 | 5/1969 | Takahashi | 47/1.4 |
| 3,195,271 | 7/1965 | Golueke et al. | 47/1.4 |
| 3,658,310 | 11/1953 | Cook | 47/1.4 |
| 3,468,057 | 9/1969 | Buisson et al. | 47/1.4 |
| 3,155,609 | 11/1964 | Pampel | 47/1.4 X |
| 3,431,200 | 3/1969 | Davis et al. | 47/1.4 X |
| 3,385,786 | 5/1968 | Klock | 47/1.4 X |

Primary Examiner—Robert E. Pulfrey
Assistant Examiner—Eugene H. Eickholt
Attorney—Irwin Morton Aisenberg

[57] ABSTRACT

Wastewater is treated in a manner which geratly reduces the level of organic waste matter, phosphates, fixed nitrogen, bacteria, virus and suspended solids. Water is reclaimed and an algae by-product is recovered by employing a series os three ponds with different depths and detention periods, each of which performs specific functions. A dissolved-air-lime flotation step is then used to separate suspended materials (primarily algae). After the flotation step the water is held at a high pH to achieve total disinfection prior to recarbonation to stabilize the water. The by-product algae material is refined by centrifugal classification of calcium carbonate from the slurry or, optionally, by alkaline hydrolysis of protein from the algae followed by acid precipitation to yield a high quality protein concentrate.

14 Claims, 2 Drawing Figures

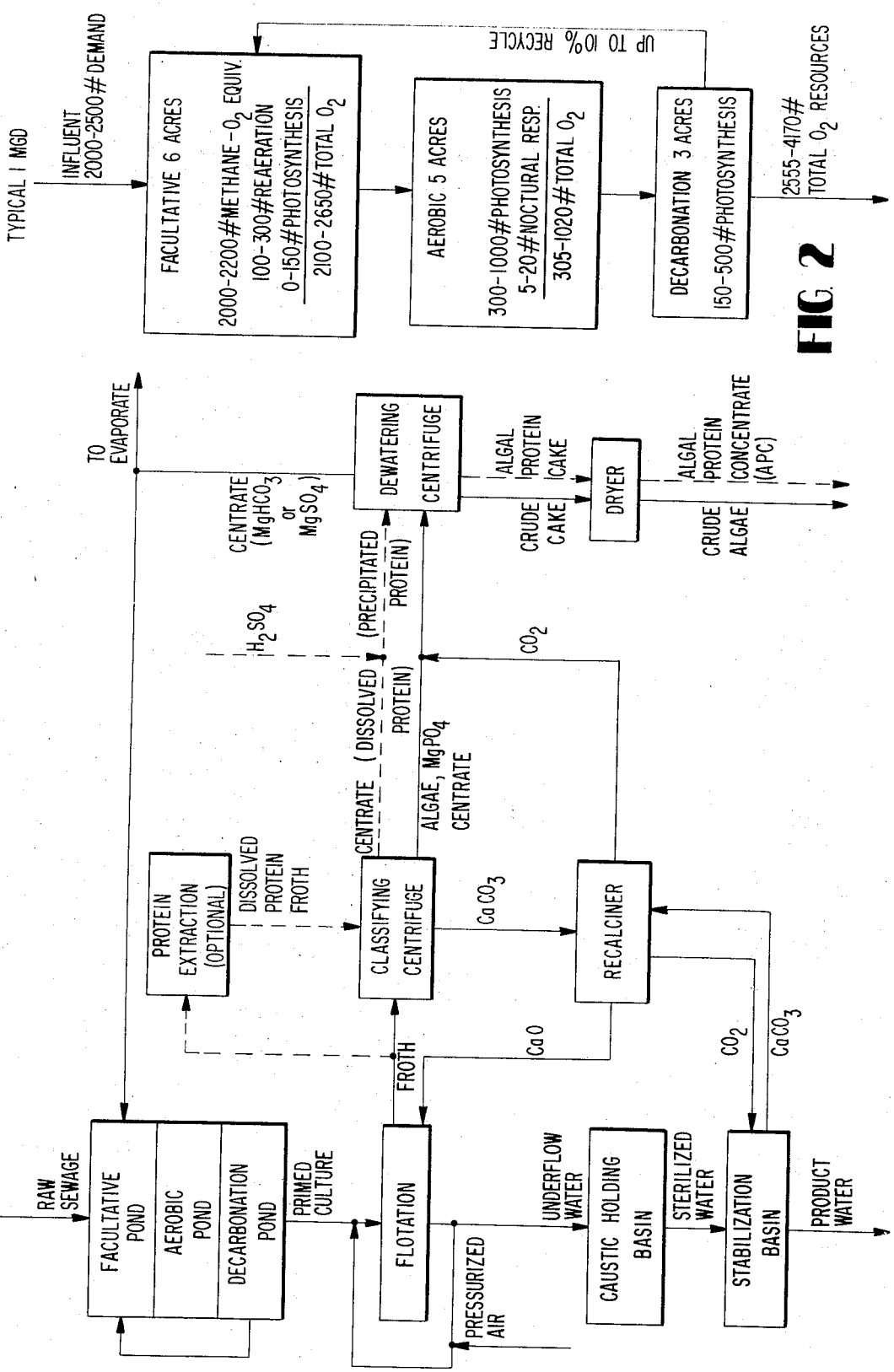

WATER RECLAMATION-ALGAE PRODUCTION

CROSS-REFERENCE TO RELATED APPLICATIONS

This application is related to and a continuation-in-part of copending application, Ser. No. 55,570 (corresponding to U.S. Pat. No. 3,645,040), filed July 16th, 1970, and is further related to application, Ser. No. 676,195 (now U.S. Pat. No. 3,521,400), filed Oct. 18th, 1967, which is a parent application of said application, Ser. No. 55,570. Further relationships between the subject matter of this application and that of issued patents are discussed in the following text.

BACKGROUND

In recent years there has been a concentrated effort to develop an economical means of treating wastewater to a quality beyond that achieved by conventional secondary treatment, e.g., trickling filters and activated sludge. At South Lake Tahoe, California, a plant has recently been built which is highly effective in producing an advanced degree of treatment. The plant achieves greatly reduced levels of organic waste matter, phosphates, fixed nitrogen, bacteria, virus and suspended solids. The Tahoe Plant consists of a conventional activated sludge plant followed by lime precipitation for phosphate removal, an ammonia stripping tower for fixed nitrogen removal, mixed media filtration for suspended solids reduction, carbon absorption for polishing and removal of dissolved organic material and chlorination for control of bacteria and viruses. These added steps make the process rather expensive in comparison to secondary treatment.

In addition to the Tahoe approach to water reclamation, certain algae-related processes have been developed, such as those described under U.S. Pat. Nos. 2,867,945 and 3,431,200. U.S. Pat. No. 2,867,945 describes the introduction of raw wastewater to a single shallow pond which is provided with mixing and recirculation. U.S. Pat. No. 3,431,200 introduces primary settled sewage to a shallow reactor basin and further describes a two-step flocculation process to remove suspended material from the water.

Of further interest is a brochure: "Wrap System Pollution Control," which describes the results of efforts of Jay E. Ort related to the subject invention.

SUMMARY OF THE INVENTION

This invention involves a number of innovative features. In its simplest configuration, raw sewage flows into the first of a series of three ponds. This first pond may be operated at a depth ranging from three to seven or more feet and is largely anaerobic except in the zone near the surface of the water. In it organic waste materials are degraded into simpler organic intermediates and inorganic materials. A limited amount of photosynthetic activity occurs at the surface of this pond in warmer weather. This first pond is designated a facultative pond. Detention time in it may vary from four days in summer (at 33° latitude — 3,000 feet elevation) to as much as ten days in winter.

The second pond is termed an aerobic pond. This pond is approximately one foot in depth and is mixed periodically. It is designed to produce a relatively high-density culture of algae. Effluent from the facultative pond flows into it and the algae culture rapidly starts to assimilate the inorganic and intermediate organic materials. The shallow depth allows adequate exposure to sunlight even when the culture has a high density of algae. Mixing provides improved availability of nutrients to the algae, helps keep pH values low, discourages the growth of predators, such as daphnia, and prevents the growth of pests, such as midges. Detention in this pond is approximately 36 to 48 hours.

The third pond is called a decarbonation pond. It is operated at 6 inches or less in depth and about 4 hours detention. It is not mixed and is normally drained at the termination of each day's operation. The function of this pond is to produce a high pH value in order to reduce the lime dosage required in the flotation step. The uptake of carbon dioxide from the bicarbonate dissolved in the water produces this upward shift in pH. This pond also attains supersaturation levels of oxygen; this facilitates flotation.

During afternoon hours (normally from 12:00 to 9:00 or 10:00 P. M.) culture is continuously withdrawn from the decarbonation pond. Adequate lime and/or other alkaline material is added to raise the pH to approximately 11.4 so that magnesium coagulates and resulting voluminous gel picks up suspended solids (primarily algae) from the water. A portion (up to 30 perent by volume) of underflow effluent from the flotation unit has air (from a pressurized tank) dissolved in it. This portion of the effluent is released under pressure (30 to 60 psi) and mixed with the incoming alkalized culture. The micro bubbles which form buoy the magnesium hydroxide and algae to the surface of the flotation tank. Skimmers continuously remove this foam blanket.

Underflow water goes to an alkaline holding basin, where it is retained for at least two hours, to effect sterilization. The water is then recarbonated to pH 9.0 to 9.5 for stabilization. Finely divided calcium carbonate precipitates and settles to the bottom of a final holding basin. This results in a sparkling clear, soft, stable, sterile water which should average approximately 1.0 mg/l BOD, 0.1 mg/l total phosphate and show a nitrogen reduction averaging 80 percent.

The foam skimmed from the flotation unit then has calcium carbonate centrifugally classified from it. The algae-magnesium hydroxide slurry is carbonated to dissolve the magnesium. The algae is dewatered either by centrifuge or filter and dehydrated to a final product. The magnesium-rich solution which is separated during dewatering may be recycled to maintain an optimum magnesium coagulant level and improve buffering of the culture or it may be routed to an evaporation pond where magnesium carbonate may be recovered as a byproduct.

Another option for the flotation foam is to store it for twelve or more hours, allowing the alkaline condition to hydrolyze protein from the algae. Calcium carbonate is then centrifugally classified; the decant water is acidified to pH 4.5; this dissolves magnesium hydroxide and precipitates protein. The protein is dewatered by filter or centrifuge and then dried; the magnesium-rich water then is recycled or evaporated for magnesium recovery.

BRIEF DESCRIPTION OF THE DRAWINGS

FIG. 1 is a flow diagram of the overall system with options appropriately indicated.

FIG. 2 is a flow diagram of the three ponds for the typical processing of 1 million gallons per day of waste.

DETAILS

The multiple pond system allows much higher loading rates and reduced land requirements compared to simple ponding operations. This is primarily a result of increased oxygen resources and more efficient use of those resouces in the multiple pond system (FIGS. 1 and 2). According to Oswald a conventionally operated facultative oxidation pond has oxygen resources of approximately 52 to 70 pounds per acre per day. 30 to 33 pounds is represented in reduced oxygen demand resulting from methane fermentation.

Seven to fourteen pounds is available from atmospheric reaeration and 15 to 23 pounds from photosynthetic activity. By comparison, a pond loaded to anaerobic levels has an oxygen equivalent of some 330 pounds per acre per day from methane fermentation and 47 pounds from reaeration for a total of 337 pounds in total oxygen resources. On the other end of the scale, high rate (shallow) ponds have upwards of 152 pounds per acre per day almost exclusively from photosynthetic activity.

The high loading and efficiency of anaerobic ponds is offset by the production of odors which prohibit their use near populated areas. Used in combination with shallow ponds as oxygen generating basins for recirculation, very high loading rates can be employed without odor problems.

Shallow ponds can generate as high as 700 pounds of oxygen per acre per day. Each pound of algae cells generated is accompanied by the generation of about 1.6 pounds of oxygen. With a retention of just under two days in shallow ponds, algae density jumps from under 50 mg/l to as high as 800 or 900 mg/l under favorable weather conditions. For design purposes the more conservative figure of approximately 150 pounds per acre should be used. By recirculation of a small portion of oxygen-rich alkaline, shallow-pond culture, a film of oxygen and alkalinity is maintained on the surface of the highly loaded first pond. This film is adequate to control odors from the pond. The odor control capability is largely the result of the alkaline nature of the film. Odors from anaerobic lagoons are primarily from the acid fermentation reaction which produces organic acids and such odorous compounds as indole, skatol, cadaverin and hydrogen sulfide. The odors indicate an inbalance between acid-forming and methane bacteria. These compounds can escape to atmosphere only when pond surface conditions are acidic.

The high absorption capacity of shallow ponds for solar energy keeps pond temperatures high during the day. In addition, oxygen generation produces values of three to four times saturation in the shallow culture. These two factors usually make the recirculation water less dense than the water of the first pond and facilitate the formation of a surface film during daylight hours. In cold weather the shallow pond culture may be cooler than the deep pond and recirculation of the denser material disturbs the methane fermentation process.

For this reason recirculation is not recommended in cold weather. Even without recirculation deep ponds do not generate objectionable odors in cold weather if proper design considerations are used. If the fresh sewage inlet to the deep pond is near the surface of the pond and the inlet is designed for low turbulence (so mixing is not encouraged), the warm fresh sewage forms a surface layer on the pond. This layer is nearly neutral in pH and keeps odors from escaping into the atmosphere.

Another deign feature which is quite beneficial is the placement of the facultative pond outflow at a proper depth. A depth of between approximately 12 and 24 inches below the surface of the deep initial pond is advisable. At this depth only a small portion of any photosynthetic growth is transferred to aerobic ponds. This encourages a build-up of algal activity on the surface and reduces the need for recirculation water in warm weather or a fresh sewage film in cold weather.

The third pond in this system is the "decarbonation" pond. This pond is operated at about 6 inches of depth, compared to 5 to 6 feet in the first pond and approximately 12 inches in the middle pond. The primary function of this pond is to allow algal activity to elevate the pH of the water and, in so doing, reduce lime requirements during phase separation. By the time culture reaches the decarbonation pond, much carbon from organic sources have been depleted and, in addition, bacterial activity is much reduced because of environmental factors in the very shallow pond. In the decarbonation pond the primary source of carbon for algal growth is bicarbonate in the water. Each $CO_2$ assimilated from bicarbonate leaves one hydroxyl ion. This produces a rise in pH. In the Lubbock area it is possible to achieve pH values in the area of 11 from Mar. through Oct. In winter, pH values normally run between pH 9.0 and 10.0. Such pH values result in a reduction in lime dosage which, for many waters, accounts for a savings of 60 to 80 percent. Under laboratory conditions pH values in excess of 12 have been produced by this phenomenon. At the Lubbock pilot plant pH levels of 11.2 are not uncommon in favorable weather. The high pH values are accompanied by supersaturation of the water with oxygen and a rise in temperature. When wind action is present, autoflocculation and flotation of algae occur in this pond area. In a properly designed system a number of incidental benefits are derived from the decarbonation pond. With proper capacity the pond produces a culture which is nitrogen limiting and produces high levels of nitrogen reduction. The high pH coupled with wind action also loses significant amounts of ammonia nitrogen to atmosphere; also, it produces precipitation of calcium phosphate and, under certain conditions, ammonium calcium phosphate. In addition, significant reduction in coliforms results from exposure to ultraviolet light, extracellular algal products and high pH. High concentrations of algae cells and associated oxygen generation assure a final water which is high in dissolved oxygen.

POND COMBINATION

The essence of one aspect of the subject invention lies in a peculiar combination of factors concerning the nature and order of treatment ponds, their depths and capacities, the detention time in each pond and the quality and quantity of influent organic waste being treated The instant system is essentially a three-pond system wherein raw organic waste is fed into a facultative pond, effluent from the facultative pond is fed (preferably essentially continuously) into an aerobic pond and effluent from the aerobic pond is fed (preferably essentially continuously during daylight hours and preferably not at all at other times) into a decarbonation pond.

RAW MATERIAL

The material being treated by the subject system is organic waste material. Such waste material varies from sewage to garbage to various types of organic industrial wastes. The organic waste is better categorized on the basis of chemical oxygen demand (COD) than on the basis of its actual source. For the purpose of this disclosure waste having a COD of from 700 to 1,000 milligrams per liter (mg/l) is regarded as having a high COD; an average COD for organic waste influent is about 500 mg/l. The capacity of the several employed ponds is dependent upon the quantity of waste being treated. FIG. 2 provides an indication of relative pond sizes for treating one million gallons per day (MGD) of organic waste.

For advantageous operation the influent should have at least 30 to 40 parts per million (ppm) of magnesium during winter months and at least 75 to 100 ppm of magnesium during summer months. If the magnesium content is below these levels, it should be supplemented (to such levels) at some stage in the system upstream of the flotation and preferably by magnesium in a water-soluble form if introduced into a pond.

START-UP

The entire operation of the ponds is essentially self-perpetuating once it is started unless the input is cut off. Initiation of digestion in the facultative pond takes place without any external effort; it is a natural process. For the start-up of the aerobic pond, however, appropriately digested effluent from the facultative pond is maintained in the aerobic pond for a period from as short as 4 or 5 days to as long as 2 or 3 weeks. The aerobic pond is operational when the density of the algae therein is in the range of from 100 to 600 mg/l. At that time effluent from the aerobic pond is transmitted to the decarbonation pond and the entire pond system is thereafter in order for essentially continuous use.

FACULTATIVE POND

The depth of this pond is not critical as long as it is at least three feet deep. It could actually be as much as twenty feet deep. For practical purposes, however, the depth is ordinarily between 3 and 7 feet. Other than at the surface, where the pH during summer months may range from neutral to as high as 9 or even 95, the pH of this pond is ordinarily from about 6 to 8. The average daily temperature runs from 70° to 85°F, preferably about 78°F, during summer months and from 35° to 50°F during winter months. For a depth of 5 feet and a throughput of 1 MGD, the surface area of this pond is varied from about 6 acres during winter months to about 3 acres during summer months.

For high COD influent detention during summer months is for 4 days (for about 10 days during winter months), as compared with a detention of about 3 days for influent having an average COD, i.e. about 500 mg/l.

During detention in the facultative pond organic influent is subjected to digestion and conversion to forms assimilable by algae. The digestion ordinarily reduces the COD by at least 40 to 60 percent. In any event effluent from the facultative pond which is fed into the aerobic pond must have a COD of at most 600 mg/l.

AEROBIC POND

The aerobic pond is maintained at about one foot in depth. Actually the depth ordinarily varies from about 8 inches to about 16 inches, particularly when no effluent is taken therefrom during night hours.

Algae grow in this pond even without any special introduction thereof. Their growth and reproduction are facilitated by sunlight; they assimilate carbon dioxide produced by digesting organic waste and yield oxygen. A relatively high density (from about 100 to about 600 mg/l) of algae culture is thus maintained.

The pH varies from about 9 to about 10.5, the average being from about 9.5 to about 10. The content of the pond is mixed (usually twice a day) at a flow rate of about one foot per second for a period of about 90 minutes. For this purpoe standard recirculation pumps (one or more) of a suitable size are employed.

For a 1 MGD throughput the surface area of this pond is about 5 acres. Detention in the aerobic pond is from 36 to 48 hours. During this time the biological oxygen demand (BOD) undergoes a reduction of from about 80 to about 90 percent.

DECARBONATION POND

Notwithstanding the fact that this pond has a depth of only 6 inches or less, the density of the algae therein is ordinarily so great that sunlight does not even penetrate to lower layers. For a 1 MGD throughput the surface area is about 3 acres. The pH may vary from 9.5 to 11.5 but, on the average, is from 10.6 to 11.3. Detention time in this pond is about 4 hours, i.e. from 3 to 5 hours. Although not absolutely essential, the decarbonation pond is preferably drained at the end of each days's operation. During periods of operation culture is preferably continuously within from the decarbonation pond and effluent from the aerobic pond is preferably continuously introduced thereinto.

RECIRCULATION

Up to about 10 percent of effluent from the decarbonation pond may be recirculated to the facultative pond. Such recirculation is not required and is not employed when the temperature of the decarbonation pond is lower than that of the facultative pond, e.g. in winter months. When the temperature of the decarbonation pond is higher than that of the facultative pond recycled effluent from the decarbonation pond forms a layer on the surface of the facultative pond and reduces odors otherwise given off from the facultative pond.

FLOCCULATION

Lime and/or other alkaline material, such as sodium hydroxide, is admixed with effluent from the decarbonation pond to adjust the pH of such effluent to about 11.4. Magnesium in the effluent coagulates at this pH and forms a ligh flocculent material which is fed (with the rest of the effluent from the decarbonation pond) to the flotation tank.

DISSOLVED AIR FLOTATION

Phase separation is basically a modified cold-lime process. Traditionally, cold-lime treatment has used sedimentation tanks for phase separation with detention times of up to 2 hours. Through the use of dissolved air flotation a detention time in the flotation tank of only 12 minutes is required.

Much of the time no supplemental dissolved air is required because of the high oxygen content of water coming from the decarbonation pond. Supersaturation oxygen forms micro bubbles after undergoing a pressure change as it passes through the feed pump. Supplemental air is supplied by pressurizing up to 30 percent of the flotation tank effluent to about 50 psi and introducing the pressurized water into the flotation tank influent. The supplemental dissolved air allows the flotation unit to operate efficiently and produce a relatively high quality effluent regardless of weather conditions. Some advantage of supplemental dissolved air is realized, particularly during winter months and/or during bad weather.

Because pH levels from the decarbonation pond are highest during the late morning hours through the hours shortly after sunset, the flotation unit is preferably designed for operation during those hours only.

The most notable application of dissolved air flotation to cold-lime treatment is at Windhoek, Southwest Africa, where reclaimed sewage water is recycled to provide about 30 percent of the city's domestic water supply. This application does not include algae and the unbalanced culture phenomenon, i.e. pH adjustment.

CAUSTIC DISINFECTION

After passing through the flotation tank, underflow water is held for at least one hour and ordinarily from one to two hours before being recarbonated. The delay in recarbonation produces a water that is essentially sterile. The high pH virtually hydrolyzes all bacterial and virus cells.

The results achieved compare very favorably with the use of chlorination of wastewater effluents. Only occasionally does the literature indicate total coliform counts of zero and then not consistently for a given effluent.

RECARBONATION

Carbon dioxide, which can emanate from any suitable source, is charged into the resulting serilized water to reduce the pH level to within the range of from about 9.0 to about 9.5. Resulting water is stabilized and suitable for use as, e.g., industrial water. Calcium carbonate precipitated at this pH is readily separated. If water having a neutral pH is desired, further carbonation, e.g., is effected. Alternatively, the pH can be reduced to about neutral in one step, but it is preferred to interrupt carbonation at a pH at which calcium carbonate is least soluble so that it can be easily separated and to a greater extent.

BY-PRODUCT PROCESSING

Froth which has been skimmed from the flotation unit consists primarily of algae cells and calcium carbonate enmeshed in magnesium hydroxide gel. In order to have a by-product with potential commercial value, it is necessary to separate calcium carbonate and magnesium hydroxide from the algae cells.

The denser calcium carbonate is readily separated from the algae and magnesium by centrifugal classification or any other suitable separation means. Pilot work showed excellent separation at surprisingly high throughput rates on a solid bowl centrifuge. At South Lake Tahoe, centrifugal classification is used to separate phosphate and magnesium from calcium carbonate prior to recalcining; this is a similar application although quite distinct.

After centrifugal classification the centrate may be recarbonated to convert the magnesim hydroxide to bicarbonate, making it soluble. Any source of carbon dioxide can be used for this purpose. The algae are next, e.g., centrifugally dewatered with magnesium being carried in the centrate (Centrifugal dewatering is ordinarily effected in a basket or Fletcher-type centrifuge. Dewatering is alernatively effected, e.g., by evaporation). This magnesium is then available for recycle. In this way the bicarbonate provides buffering capacity in the pond system and magnesium is maintained at an optimum level as the primary coagulant. The dewatered algae is in the form of a cake with upwards of 20 percent solids and is ready for dehydration and storage. The recycled magnesium buffer is also beneficial in odor control in the facultative pond.

When the froth stands at a high pH for a number of hours before dewatering, the algae cake has very low protein values. An analysis of extracted water shows a high Kjehldahl nitrogen level, indicating protein hydrolysis. The Russians have done some research in the area of mechanically breaking algae cells and extracting protein from algae with caustic solutions to produce a high quality concentrate. Acidifying hydrolyzed protein to pH 4.5 produces precipitation and a potentially valuable refined product.

PROCESS PERFORMANCE

Table I lists the performance values recorded at the pilot facility.

TABLE I

| | In | Out | Reduction |
|---|---|---|---|
| $BOD_5$ | 280–450 | 0–3 | 99–100 |
| COD | 700–960 | 21–64 | 92–96 |
| Total Phosphorus | 14–18 | 0.02–0.06 | 99.4–99.9 |
| Total Nitrogen | 72–82 | 2.0–29.6 | 64–97 |
| Total Coliforms | $10–30 \times 10^6$/100ml | zero | 100 |
| Enterovirus | 1844/gal. | zero | 100 |
| Total Hardness | 260–290 | 28–132 | 60–90 |
| Silica | 45–55 | 4.6–5.2 | 89–92 |
| Suspended Solids | 240–360 | 0–50 | 86–100 |

A comparison with the results obtained at the South Lake Tahoe plant reveals that the pilot plant operated at efficiencies approximately equal to those at Tahoe. BOD and nitrogen removal are essentially identical for Tahoe; phosphorus and coliform reduction are somewhat better, and COD and suspended solids are slightly lower.

It should be noted that influent COD's average 800 – 900 mg/l compared to 300 to 400 at Tahoe. Also, the suspended solids from the pilot plant are almost entirely calcium carbonate, reflecting a design deficiency after recarbonation; this can readily be corrected in scale-up.

Improved nitrogen and COD removal are achieved through incorporation of several design factors developed in the pilot facility.

The various wastewaters amenable to treatment by the system include domestic sewage, animal wastes, meat-packing wastes, certain other food-processing wastes and any industrial wastes that are essentially organic in nature and primarily water-borne.

Below are listed the more important material balances for the system; COD representing organic carbon; phosphorus; nitrogen and algal solids concentration.

MATERIAL BALANCES—TYPICAL RANGE

| | Unfiltered COD mg/l | P mg/l | N mg/l | Total algal solids mg/l or percent |
|---|---|---|---|---|
| Raw sewage | 400/1000 | 10/20 | 40/100 | 0 |
| Facultative pond Effluent. | 200/600 | 10/20 | 30/80 | 0–0.005 (50 mg/l) |
| Aerobic pond Effluent. | 200/600 | 5/15 | 20/50 | 0.01–0.06 (100–600 mg/l) |
| Decarbonation pond effluent. | 200/600 | 2/12 | 5/30 | 0.015–0.10 (150–1000 mg/l) |
| Recarbonator-classifier basin effluent. | 15/65 | 0.01/0.10 | 1/25 | nil |
| Classifier | | | | 2–6 |
| Thickener-steeping tank. | | | | 4–8 |
| Dewatering centrifuge. | | | | 16–26 |
| Drier | | | | 90–92 |

Typical equipment which may be used in the process includes:

Flotation — Permatit Favair Mark II
Classifying Centrifuge — Sharples Solid Bowl Super-D-Center
Dewatering Centrifuge — Sharples Sludgepak
Dryer — Arnold Ardrier — Alfalfa Dehydrator
Recalciner — Midland-Ross Surface Recarbonator
Lime-Feed pH Control — BIF Lime Feed System — Leeds & Northrup pH Controller-Recorder

CARBONAION OF FROTH OPTION

A slurry of froth from the flotation is carbonated to a pH of from about 9.5 to about 10.5 and maintained essentially quiescent for a period of from 10 to 15 hours, usually about 12 hours. Thickening occurs and magnesium dissolves. The dissolved magnesium can be readily recovered and/or recycled, e.g., to the facultative pond or even the raw organic waste starting material. When calcium carbonate is removed from the thickened material, separating, e.g. centrifuging, requirements are reduced.

PROTEIN EXTRACTION OPTION

A slurry of froth from the flotation is subjected to a pH of from about 11.5 to about 14.0 (by any suitable means, e.g. by admixing an aqueous solution of sodium hydroxide therewith) for a period of from 9 to 18, ordinarily about 12 hours. During this period protein in the algae is solubilized. Calcium carbonate is removed from the resuling product by, e.g., solid bowl centrifugation. The remaining centrate, which contains deproteinized algae, dissolved protein and magnesium, is acidifed (with any suitable acid, e.g. sulfuric acid) to a pH of about 4.5, whereupon the protein is precipitated and the magnesium is solubilized. Dewatering, e.g. by basket centrifuge, produces an algal protein cake and dissolved magnesium values which can be separated or recycled. The algal protein cake can be dried to yield an algal protein concentrate (apc).

MAGNESIUM

As described, the flotation process depends upon the presence of magnesium values in the system. In many parts of the country the magnesium in the water in the incoming organic waste will be adequate and no further incorporation of magnesium is required. When the incoming organic waste contains less than 30 to 40 ppm of magnesium during the winter or less than 75 to 100 ppm of magnesium during the summer, it is preferred to supplement influent to these levels. Such supplement is readily provided by soluble magnesium values obtained by the subject process. Outside of the sunlight required for the ponds, particularly the aerobic and the decarbonation ponds, no other additament is required for this part of the sytem. In making this statement, it is fully realized that the algae spores which initiate growth in the aerobic pond are normally airborne; no positive inoculation of algae is required.

RELEVANT PAPERS

The inventor of the instantly disclosed and claimed invention has prepared several papers which are incorporated as part of the subject disclosure. One was prepared in mid 1970 and is entitled: "Wrap Sytem Pollution Control." The other has just been prepared and is entitled: "Water and Nutrient Conservation Through an Algal-Chemical System."

EXAMPLE

One million gallons per day of raw municipal sewage enters the facultative pond. This pond area is in three parallel modules of two acres each and is normally operated at a depth of four to six feet. In midsummer only one of the modules is normally operated while all three are required in winter.

Effluent from the facultative pond flows into the aerobic pond. This unit has an area of five acres, is baffled to produce channelized flow during mixing and is operated at about one foot depth.

Efflent from the aerobic pond goes into the decarbonation pond from sunrise to about 6:00 P. M. The decarbonation area is divided into three parallel elongated modules of one acre each.

The pH of effluent culture from the decarbonation pond is adjusted as necessary by a pH sensor-controller system or other commercially available means which feeds lime to maintain a pH between 11.3 and 11.5. This alkalized culture is mixed with recycled air-water flow and then enters the flotation unit.

From 40 to 60 pounds per square inch gage (psi) of air is introduced into water recycled from underflow of the flotation unit. The recycled water is up to 30 percent of such underflow.

Algae, magnesium hydroxide and calcium carbonate foam float to the surface of the flotation unit from which they are skimmed. Underflow water (not recirculated) goes into a bain where it is held for four hours. It is then recarbonated to pH 9.0 to 9.5 and flows into a settling basin. After being held for approximately 24 hours, the water may be further recarbonated to neutral (if desired) before being released.

Foam from flotation is centrifuged to classify out calcium carbonate; it is then carbonated to dissolve magnesium; remaining algae is dewatered by centrifuge and dehydrated for storage. Magnesium-rich water is recycled or evaporated.

Alternately, foam is stored for 12 hours or more, classified by centrifuge, acidified with, e.g., sulfuric acid to a pH of about 4.5, and dehydrated to a final algae protein concentrate. Acidified magnesium is, likewise, recycled or evaporated.

What is claimed is:

1. A multiple pond organic waste treatment system which comprises:
   a. a facultative pond which is largely anaerobic and which has at least one inlet means and outlet means;
b. a decarbonation pond which has inlet means and at least one outlet means;
c. an intermediae aerobic pond which has inlet means connected to the outlet means of the facultative pond and outlet means connected to the inlet means of the decarbonation pond;
d. flotation means having inlet means connected to the otlet means of the decarbonation pond and plural outlet means, one outlet means being an underflow outlet means and another being a froth outlet means;
e. separating means for separating calcium carbonate from calcium carbonate containing froth, the separating means having froth inlet means connected to the froth outlet means of the flotation means and having plural outlet means, one of which is means for removing separated calcium carbonate and another of which is means for removing matter from which the calcium carbonate has been separated; and
f. dewatering means connected to the outlet means of the separating means for removing matter from which the calcium carbonate has been separated.

2. A multiple pond organic waste treatment system according to claim 1 wherein the facultative pond has inlet means for receiving magnesium values from the dewatering means.

3. A multiple pond organic waste treatment system according to claim 1 wherein the facultative pond has inlet means connected to decarbonation pond outlet means for recirculating effluent from the decarbonation pond to the facultative pond.

4. A multiple pond organic waste treatment system according to claim 1 wherein recycling means connects the underflow outlet means to the inlet means for the flotation means, and the recycling means is provided with means for introducing pressurized gas thereinto.

5. A multiple pond organic waste treatment system according to claim 1 which further comprises:
g. caustic holding basin means for hydrolyzing bacterial and viral cells and having inlet means and outlet means, the inlet means being connected to said underflow outlet means of the floation means;
h. stabilization basin means having at least one inlet means and plural outlet means, one inlet means being connected to the outlet means of the caustic holding basin means and one outlet means being means for removing calcium carbonate precipitate therefrom;
i. recalciner means for converting calcium carbonate from the stabilization basin means and from the separating means into lime and carbon dioxide;
j. means for conducting lime from the recalciner means into the flotation means; and
k. means for conducting carbon dioxide from the recalciner means into the stabilization basin means.

6. A multiple pond organic waste treatment system according to claim 1 wherein the separating means is classifying centrifuge means of the solid bowl type and wherein the dewatering means is centrifuge means of the basket tpe.

7. A multiple pond organic waste treatment system according to claim 1 having a dryer means and means to convey dewatered solids from the dewatering means to the dryer means.

8. In a method for producing algae from organic waste, the improvement wherein a) raw organic waste is passed sequentially through a first pond having a depth of at least three feet, a second pond having a depth of about one foot and a third pond having a depth up to six inches, b) waste is maintained in the first pond for a period sufficient to reduce the chemical oxygen demand thereof at least 40 percent and to a level of at most 600 milligrams per liter, c) effluent from the first pond is maintained in the second pond for a period sufficient to reduce the biological oxygen demand thereof at least 75 percent, d) effluent from the second pond is maintained in the third pond for a period of from 3 to 5 hours, e) magnesium in effluent from the third pond is flocculated by adjusting the pH of that effluent to about 11.4 and f) thus-treated effluent from the third pond is subjected to flotation.

9. A process according to claim 8 which comprises maintaining underflow water from the flotation in a separate vessel for at least one hour to obtain water which is effectively sterilized.

10. A process according to claim 8 which comprises removing calcium carbonate from froth obained during flotation, carbonating the resulting froth to solubilize magnesium values therein and effecting a solid/liquid separation of the thus-carbonated material, the obtained liquid containing magnesium values and the obtained solids comprising crude algae cake.

11. A process according to claim 8 which comprises carbonating froth obtained from flotation to a pH of from 9.5 to 10.5, maintaining the thus-carbonated froth within that pH range for from 10 to 15 hours, and removing dissolved magnesium values and then calcium carbonate from the resultant.

12. A process according to claim 8 which comprises increasing the pH of froth obtained from flotation to a pH of from 11.5 to 14.0, maintaining the thus-treated froth at that pH for a period sufficient to solubilize protein therein, separating calcium carbonate from the resultant, acidifying the remainder to precipitate protein therein and separating an algal protein cake.

13. A process according to claim 8 for producing algae and usable water which comprises:
a. maintaining underflow water from the flotation essentially quiescent for a period sufficient to obtain effectively sterilized water;
b. removing calcium carbonate from froth from the flotation to obtain a product which contains algae and magnesium values;
c. carbonating the product to solubilize the magnesium values therein; and
d. separating the water solubles from the water insolubles, the solubles containing the magnesium values and the insolubles comprising crude algae.

14. A process according to claim 1 which comprises recycling the solubles containing magnesium values to the first pond.

* * * * *